INVENTORS
Gilbert K. Hause
George R. Smith
BY
D.D. McGraw
Their Attorney great# United States Patent Office 3,303,911
Patented Feb. 14, 1967

3,303,911
FLUID COOLED BRAKE MECHANISM
Gilbert K. Hause and George R. Smith, Bloomfield Hills, Mich., assignors to General Motors Corporation, Detroit, Mich., a corporation of Delaware
Filed Dec. 7, 1964, Ser. No. 416,291
1 Claim. (Cl. 188—264)

The invention relates to a fluid cooled brake and more particularly to one in which a brake rotatable member is constructed with a coolant circulating pump as an integral part of the member. Brake mechanisms embodying the invention are particularly adapted to be installed on vehicles of current design with a minimum of vehicle modification. This is accomplished by designing the brake mechanisms so that they occupy substantially the same space as drum brakes normally used on automobiles, and are attached to the steering knuckles of the front suspension or their equivalent structures in the rear suspension. In its preferred form, the invention is embodied in a single disc brake assembly with the braking disc being slidably splined to a mounting disc and the mounting disc in turn being slidably splined to the wheel hub so that the two discs can move axially while being prevented from relative rotational movement. The mounting disc incorporates liquid coolant pump vanes or blades which are preferably formed as an integral part of the disc. The pump mechanism comprises one or more pump chambers, portions of which are formed by the brake housing. A static or stationary housing is preferably constructed with an inner side and an outer side and secured together by bolts with conical heads fitting in conical seats so as to be self-sealing and thereby permit a smaller radial housing dimension which adds to housing rigidity. When tightened, the housing bolts also compress an outer peripheral seal positioned between the two housing sides so as to seal the outer portion of the liquid coolant chamber formed by the housing. The construction permits the use of a liquid coolant which also lubricates the wheel bearings.

Liquid coolant is introduced into the brake housing adjacent the inner periphery of the mounting disc and flows radially outward through passages provided by the spaced relationship of the mounting disc and the housing sides to the inlet of the pump mechanism. Coolant fluid is pumped by rotational movement of the mounting disc relative to the housing and the consequent action of the vanes on the coolant. The fluid passes radially outward of the pump area to the annular brake disc and friction pad area. The friction pads are provided with generally radially extending passages, preferably of the type shown in U.S. Patent 3,061,048. Coolant fluid flows through these passages, picking up heat generated by braking action, to a coolant collecting chamber formed inside the outer periphery of the housing. The heated coolant is then conducted out of the brake housing to a coolant reservoir and heat exchanger. After heat is removed from the coolant, the coolant is returned to the coolant inlet at the inner periphery of the mounting disc. When the brake is applied, action of the brake friction pads on the brake disc will not distort the pump element due to the spline construction of the brake disc in relation to the mounting disc. A sealing arrangement is provided between the housing outer side and the wheel hub which holds coolant inside the housing at the seal and utilizes the inlet pump action of the pump mechanism to keep pressure from building up against the interior of the seal and therefore possibly causing coolant loss. This is accomplished by placing the seal generally radially inward from the pump mechanism and providing a passage extending generally radially outward from the interior side of the seal to the inlet side of the pump mechanism.

In the drawing:

FIGURE 3 is an enlarged fragmentary view of a portion of the brake mechanism as illustrated in FIGURE 2, with particular emphasis on the mechanism inside the brake housing and especially including the liquid coolant pump construction.

Figure 1:
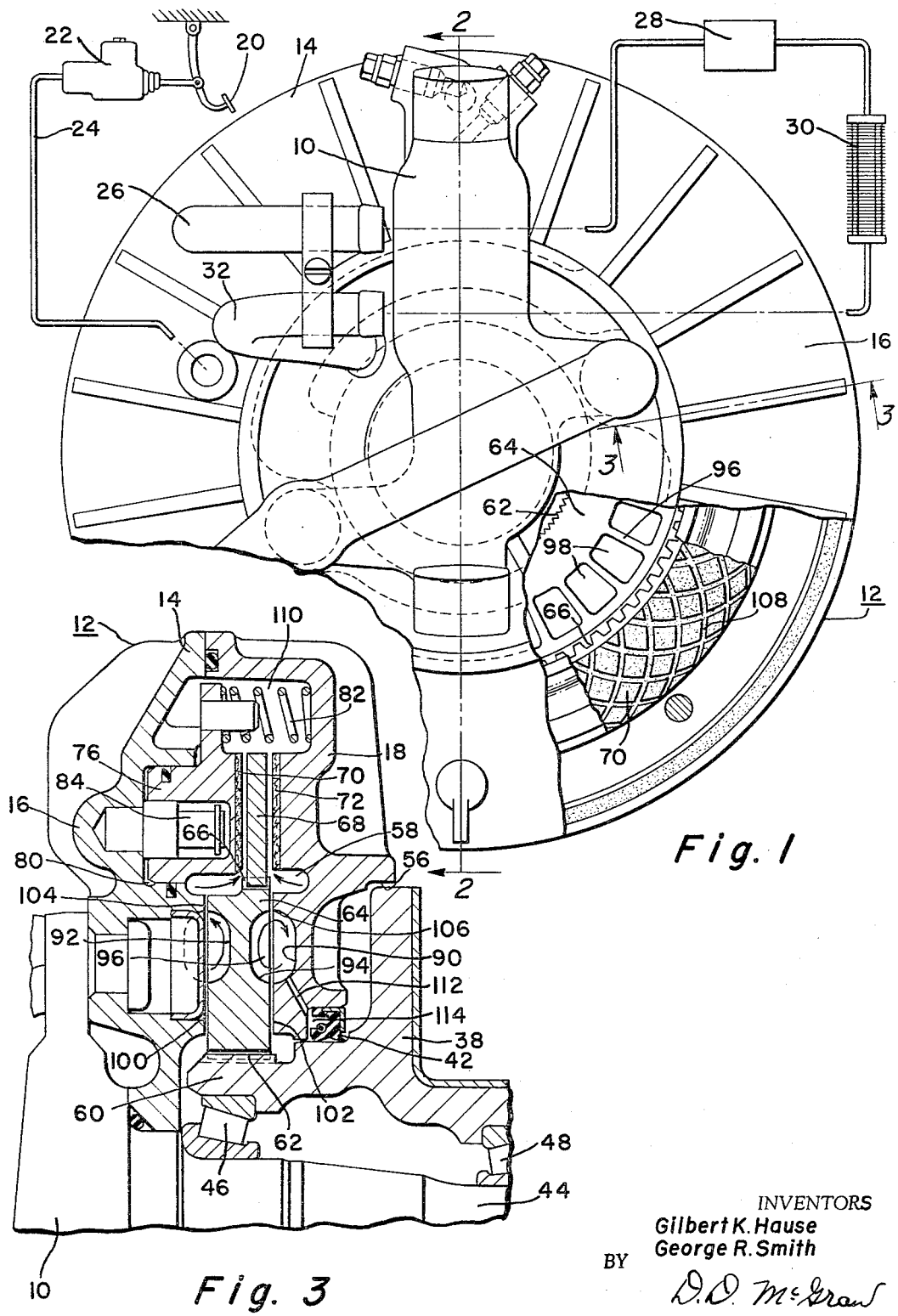
FIGURE 1 is an elevational view of a front wheel suspension and brake assembly embodying the invention, with parts broken away and in section, and showing schematically an operational brake energizing system and the portions of the brake coolant system exterior of the housing.

The brake mechanism is illustrated as being installed on a front vehicle suspension mechanism including a steering knuckle 10. The brake assembly 12 includes a housing 14 formed with an inner side 16 and an outer side 18. The brake actuating system includes a brake pedal 20, a master cylinder 22 and suitable hydraulic brake fluid conduit means 24. Only one brake assembly is illustrated, but it is obvious that other brake assemblies may be actuated by pressurized hydraulic brake fluid conducted through conduit means 24 to such brake assemblies. The brake coolant system exterior of the brake assembly 12 includes the coolant outlet 26 connected to the coolant reservoir 28 and the heat exchanger 30. The heated coolant liquid is cooled by heat exchanger 30 and the liquid so cooled is returned to the coolant inlet 32. The brake system and the coolant system exterior of the brake assembly is illustrative only and any suitable system may be utilized.

Figure 2:
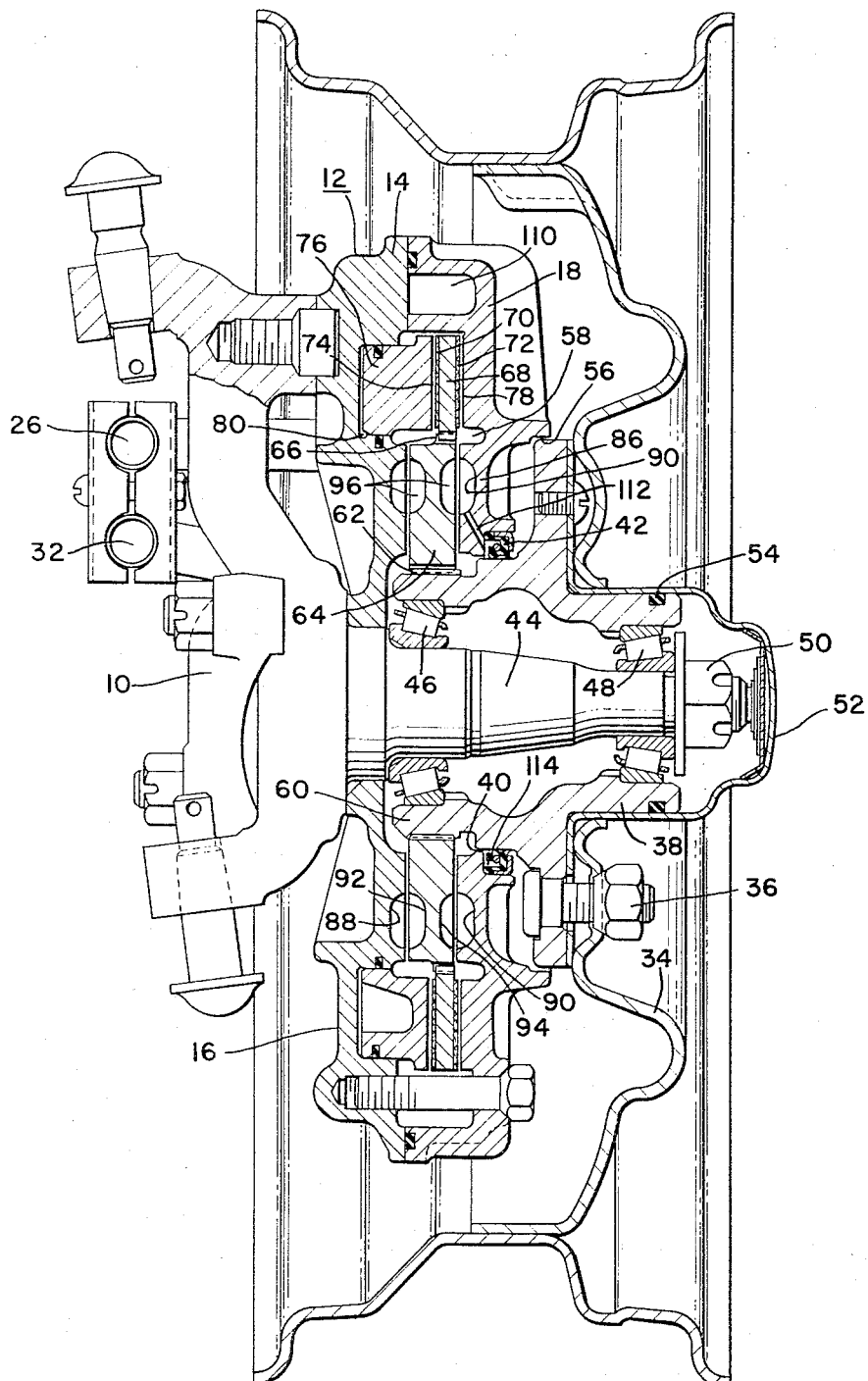
FIGURE 2 is a cross-sectional view of the brake mechanism of FIGURE 1, with parts broken away, and taken in the direction of arrows 2—2 of that figure.

As better shown in FIGURE 2, a wheel 34 is secured by wheel bolt and nut assemblies 36 to a wheel hub 38. The housing outer side 18 is provided with a central opening 40 into which one end of hub 38 extends. A seal 42 positioned between the housing outer side and the hub seals the two members so as to prevent the escape of fluid. The steering knuckle 10 has an axle 44 formed thereon and the wheel bearings 46 and 48 provide a suitable mounting for the hub 38. The wheel hub is held in place by the nut 50 threaded on the end of axle 44. A hub cap 52 surrounds the outer end of the hub and a suitable seal 54 prevents fluid leakage between the hub and the hub cap. Hub 38 is piloted at 56 in suitable pilots formed on the outer side 18 of the housing 14.

The interior of the housing 14 is formed to provide a brake and brake cooling chamber 58 between the housing inner and outer sides. Chamber 58 is generally annular and is open at its inner periphery. The inner end 60 of hub 38 is received adjacent the inner periphery of chamber 58 and is provided with splines 62. An annular mounting disc 64 is splined to hub 38 by means of splines 62 so that the disc rotates with the hub, but is axially slidable thereon. The outer periphery of the mounting disc 64 has splines 66 formed thereon and an annular brake disc or friction plate 68 is mounted on the outer periphery of disc 64 by the splines so that it is rotatable with disc 64 and axially slidable relatively thereto.

As illustrated in FIGURE 2, friction pads 70 and 72 are secured to opposite sides of disc 68 and are respectively engageable by friction surface 74 of the brake apply piston 76 and friction surface 78 formed on housing outer side 18. In some instances it is desirable to install the friction pads 70 and 72 on the piston 76 and the housing surface 78 instead of on the disc 68, and this construction is illustrated in FIGURE 3. The brake apply piston 76 is hydraulically actuated by pressurized fluid conducted to chamber 80 behind the piston through conduit means 24. When the master cylinder 22 is energized by depressing the pedal 20, hydraulic pressure moves piston 76 to the right to engage the brake disc 68. The brake disc is then moved axially, as is permitted by means of splines 66, to engage the housing outer side 18. As pressure is then further built up in chamber 80, the desired braking force is applied to the disc 68 and is transmitted through mounting disc 64 and hub 38 to wheel 34. A suitable number of retracting springs 82 are compressed upon actuation of piston 76 and, when the braking pressure is released, move the piston a desired distance in the retraction direction so as to release the brake disc 68. A suitable brake adjuster 84, which may be of the type shown in U.S. Patent 3,061,048 is utilized to determine the amount of piston retraction and maintain it within desirable limits.

A radially central portion of the mounting disc 64 and axially adjacent portions of the housing 14 are constructed to provide a liquid coolant pump mechanism 86. The pump mechanism preferably includes toroidal recesses 88 and 90 formed in housing sides 16 and 18 and similar recesses 92 and 94 formed in opposite sides of mounting disc 64. Vanes or blades 96 separate recesses 92 and 94 into a circumferentially extending series of recesses or spaces 98. Blades 96 are illustrated as extending radially outward of the mounting disc 64 and integrally formed therefrom. This construction is preferable from the standpoint of simplicity and overall strength. However, blades of other shapes may be provided, and the blades may be separately formed and secured to the disc if necessary. The inner peripheral portion of mounting disc 64 and the adjacent portions of housing sides 16 and 18 are in such a spaced relation that they provide fluid coolant inlet passages 100 and 102 through which coolant fluid passes from the inner periphery of chamber 58 where coolant inlet 32 is connected. Passages 100 and 102 connect with the inlets of the pump mechanism 86. Similar passages 104 and 106 are provided radially outward of the pump mechanism 86 by the spaces between the outer periphery of mounting disc 64 and the axially adjacent portions of housing sides 16 and 18. These passages connect the outlet side of the pump mechanism with the outer peripheral portion of chamber 58 containing brake disc 60. Friction pads 70 and 72 are provided with generally radially extending channels or passages 108 which permit the coolant to flow outwardly across the faces of the brake mechanism in heat exchanging relation and then to flow into a collecting chamber section 110 formed between extreme outer periphery of chamber 58. Chamber section 110 is fluid connected with the coolant outlet 26 through which the heated coolant flows.

The interior side of seal 42 is exposed to coolant which is radially inward of the pump mechanism 86. In order to prevent the possibility of any pressure build-up against seal 42, a passage 112 connects the radially outer portion of the seal recess 114 with the inlet side of a portion of the pump mechanism 86. Thus, the pump mechanism tends to evacuate seal recess 114 and eliminate the build-up of any pressure therein. This contributes to longer seal life and helps eliminate the possibility of loss of coolant fluid.

When a vehicle having brake mechanism embodying the invention installed is in motion, the rotation of wheel 34 also rotates mounting disc 64 and brake disc 68. The blades 96 of the pump mechanism 86 acts in a manner similar to the pump of a fluid coupling, causing liquid coolant to circulate in a manner shown by the arrows of FIGURE 3. The coolant utilized also lubricates bearings 46 and 48, but no circulation of the fluid contained within hub 38 is necessary. The cool fluid enters the inner periphery of chamber 58 and is pulled through passages 100 and 102 and passage 112 into the pump chambers formed by recesses 88, 90, 92 and 94. The action of the blades 96 on the fluid pressurizes the fluid and causes it to pass through passages 104 and 106 and past the brake mechanism through the friction pad passages 108. If the brake mechanism is released, the spaces on either side of brake disc 68 also operate to conduct fluid outwardly to the collecting chamber section 110. When the brakes are applied, only passages 108 conduct the fluid to the chamber section 110. When the brakes are applied heat is generated by the brake mechanism in the area of disc 68 and this heat is transferred to the coolant fluid. The heat is removed from the coolant fluid by the heat exchanger 38 and the cooled fluid is then returned to the brake assembly from inlet 32.

We claim:

A liquid cooled brake comprising in combination: a static housing having a central opening, a rotatable member to be braked rotatably and sealingly mounted in said opening and extending outwardly therefrom, an annular chamber formed in said housing radially outward of and connecting with said central opening at the chamber inner annulus, an annular mounting disc splined to said rotatable member for rotary movement therewith and axially slidable movement thereon, a radially central section of said mounting disc having recessed pumping blades thereon in circumferentially spaced and axially recessed relation, pump recess means formed in said housing in axial alignment with said pumping blades and cooperating therewith to define pump chamber means, brake friction disc means splined to the outer periphery of said mounting disc for rotating movement therewith and axially slidable movement thereon, friction braking means mounted in said housing annular chamber and rotatably fixed relative to said housing and axially movable relative to said fraction disc means to frictionally engage said friction disc means and apply braking force thereto, liquid coolant inlet means radially inward of said pumping chamber means, said housing and said mounting disc being in axially spaced relation to provide liquid coolant radial passage pump inlet means radially inward of said pump chamber means and liquid coolant radial passage pump outlet means radially outward of said pump chamber means, said friction disc means and said friction braking means having generally radially extending liquid coolant flow passage means at adjacent surfaces thereof and connected in liquid coolant flow receiving relation with said radial passage pump outlet means, liquid coolant outlet means in said housing fluid connected radially outward of said friction disc means, seal means axially spaced from and radially inward of said pump chamber means and sealing said housing and said rotatable member, and passage means formed in said housing and connecting the liquid coolant side of said seal means with the radially inner portion of said pump chamber means whereby liquid coolant pressure on said seal means is reduced by the pumping action of said pumping blades.

References Cited by the Examiner

UNITED STATES PATENTS

| | | | |
|---|---|---|---|
| 1,973,669 | 9/1934 | Spoor | 103—96 |
| 2,238,943 | 4/1941 | McCune et al. | 188—264 X |
| 2,816,630 | 12/1957 | Kelley et al. | 188—264 |
| 2,928,504 | 3/1960 | Hahn et al. | 188—264 X |
| 3,061,048 | 10/1962 | Alsorbrooks et al. | 188—264 X |
| 3,202,253 | 8/1965 | Merritt et al. | 192—113 |

FOREIGN PATENTS 944,156   12/1963   Great Britain.

MILTON BUCHLER, *Primary Examiner.*

G. E. A. HALVOSA, *Assistant Examiner.*